US011966672B2

(12) United States Patent
Yin et al.

(10) Patent No.: US 11,966,672 B2
(45) Date of Patent: Apr. 23, 2024

(54) METHOD AND SYSTEM FOR SIMULATING CONTACT AND INTERACTION BETWEEN SUPPORT MEMBER AND CHAMBER SURROUNDING ROCK MASS

(71) Applicant: CHINA UNIVERSITY OF MINING AND TECHNOLOGY, Xuzhou (CN)

(72) Inventors: Qian Yin, Xuzhou (CN); Jiangyu Wu, Xuzhou (CN); Hongwen Jing, Xuzhou (CN); Zheng Jiang, Xuzhou (CN); Tianci Deng, Xuzhou (CN); Hai Pu, Xuzhou (CN); Qiang Zhang, Xuzhou (CN); Bo Meng, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 0 days.

(21) Appl. No.: 18/352,344

(22) Filed: Jul. 14, 2023

(65) Prior Publication Data
US 2024/0020442 A1    Jan. 18, 2024

(30) Foreign Application Priority Data

Jul. 15, 2022  (CN) .......................... 202210836163.8

(51) Int. Cl.
  *G06F 30/25*   (2020.01)
  *G06F 111/10*  (2020.01)
(52) U.S. Cl.
  CPC .......... *G06F 30/25* (2020.01); *G06F 2111/10* (2020.01)
(58) Field of Classification Search
  CPC .............................. G06F 30/25; G06F 2111/10
  (Continued)

(56) References Cited

U.S. PATENT DOCUMENTS 11,098,582 B1 *  8/2021  Camargo ............... G01V 20/00
2013/0238304 A1 *  9/2013  Glinsky ................. G06F 30/20
                                                  703/6
(Continued)

FOREIGN PATENT DOCUMENTS

CN   108195689 A   6/2018
CN   112989668 A   6/2021

OTHER PUBLICATIONS

Xie et al. ("Two-Dimensional Numerical Model for Stability Analysis of Tunnel Face Based on Particle Flow Code", MPDI, 2021, pp. 1-9) (Year: 2021).*

(Continued)

*Primary Examiner* — Iftekhar A Khan
(74) *Attorney, Agent, or Firm* — Pilloff Passino & Cosenza LLP; Sean A. Passino; Rachel K. Pilloff

(57) ABSTRACT

A method and a system for simulating contact and interaction between a support member and a chamber surrounding rock mass are provided in the application. The method includes: obtaining a support scheme of a roadway to be simulated, dividing the roadway to be simulated based on the support scheme to obtain several roadway sections; obtaining physical and mechanical parameters of each rock stratum in each roadway section and an occurrence state of the roadway surrounding rock; constructing particle flow numerical models corresponding to the roadway section; through the particle flow numerical models of every two adjacent roadway sections, obtaining a particle flow meso-structural evolution model of the roadway to be simulated; obtaining meso-mechanical parameters of the roadway to be simulated based on the particle flow numerical models, calibrating the meso-mechanical parameters through the physical and mechanical parameters, establishing the par- (Continued)

ticle flow meso-structural evolution model of the roadway to be simulated.

2 Claims, 11 Drawing Sheets

(58) Field of Classification Search
USPC .............................................................. 703/6
See application file for complete search history.

(56) References Cited

U.S. PATENT DOCUMENTS

| | | | | |
|---|---|---|---|---|
| 2019/0332733 | A1* | 10/2019 | Ji | G06F 30/23 |
| 2020/0202046 | A1* | 6/2020 | Liu | G01N 33/383 |
| 2021/0231013 | A1* | 7/2021 | Jiang | E21D 9/1013 |
| 2021/0263003 | A1* | 8/2021 | Wang | G01N 3/08 |
| 2021/0285857 | A1* | 9/2021 | Zhang | G01M 5/0025 |

OTHER PUBLICATIONS

Ao et al. ("Meso fracture characteristics of granite and instability evolution law of surrounding rock in deep cavern", Scientific Reports, 2022, pp. 1-19) (Year: 2022).*

Wu et al. ("3D Discrete Element Method Modelling of Tunnel Construction Impact on an Adjacent Tunnel", KSCE Journal of Civil Engineering (2020) 24(2):657-669) (Year: 2020).*

Notice of Registration for China Application No. 202210836163.8, dated Jun. 19, 2023.

First Office Action for China Application No. 202210836163.8, dated Jan. 20, 2023.

Liao Jiubo et al., "Numerical simulation of liner during soft tunnel excavation by particle flow code based on discrete element method," Journal of Central South University (Science and Technology), Apr. 2013, pp. 1,639-1,646, vol. 44, No. 4.

Liu Wanrong et al., "Particle-discrete-element-method-based research on acoustic emission characteristics and energy evolution laws of surrounding rock in different lithologic roadway," Journal of Mining & Safety Engineering, Mar. 2017, pp. 363-370, vol. 34, No. 2.

* cited by examiner

METHOD AND SYSTEM FOR SIMULATING CONTACT AND INTERACTION BETWEEN SUPPORT MEMBER AND CHAMBER SURROUNDING ROCK MASS

CROSS-REFERENCE TO RELATED APPLICATIONS

This application claims priority to Chinese Patent Application No. 202210836163.8, filed on Jul. 15, 2022, the contents of which are hereby incorporated by reference.

TECHNICAL FIELD

The application belongs to a technical field of roadway safety, and in particular to a method and a system for simulating contact and interaction between a support member and a chamber surrounding rock mass.

BACKGROUND

As coal mines are exploited increasingly deep and intensively, there is a growing number of rock burst mines, and the frequency and intensity of rockburst also increase year by year. Rock burst is a kind of dynamic disaster triggered by the sudden release of elastic energy in surrounding rock mass during coal mining. It was believed that rock burst mainly occurred in mining roadway. However, at present, the rock burst often occurs in the development roadway of new mines and in the excavation of coal roadway in deep production mines, which has caused great harm to the safe mining of mines.

Zhang Nong et al. have done a lot of research on the deformation and failure of rock burst roadway. Pan Yishan et al. study the impact failure process of coal and rock roadway under different supporting conditions by combining the physical simulation with the numerical model, analyzed the dynamic failure process and failure mechanism of roadway surrounding rock under impact load, think that the broken caving of roadway roof rock mass is the result of repeated shock waves, and based on this, propose the energy-absorbing supporting structure method to reduce the failure degree of rockburst roadway. Dou Linming et al. adopt the interaction model of plane P wave and circular roadway, and obtained that the roadway deformation and failure under strong impact load is a single instantaneous collapse failure, while under cyclic weak impact loads, when the surrounding rock damage reaches a certain level, a small dynamic load disturbance can induce the roadway impact failure, and propose to weaken the strength of coal and rock mass by pressure relief to avoid the occurrence of rock burst accidents. Kang Hongpu et al. take the deep rockburst roadway in Changcun Coal Mine as the engineering background, analyze the deformation and failure characteristics and main influencing factors of the rockburst roadway, and put forward the supporting principle and parameter design method of the rockburst roadway. Gu Jincai et al. study the anti-explosion performance of the anchorage structure of the surrounding rock mass under different bolt support parameters, and think that simply increasing the bolt length could not effectively improve the anti-explosion performance of the anchorage structure of the surrounding rock mass, and the crack evolution in the anchorage structure of the surrounding rock mass must be suppressed under a certain bolt density.

However, the current research results mainly analyze the dynamic mechanical response characteristics of roadway surrounding rock mass under dynamic impact loads from a macro perspective, and rarely reveal the impact instability mechanism of roadway surrounding rock mass under dynamic load disturbance from a micro perspective.

SUMMARY

This application proposes a method and a system for simulating contact and interaction between a support member and a chamber surrounding rock mass, reflecting the macro structural changes from a meso perspective and providing reference for improving support schemes.

In order to achieve the above purpose, the application provides a following scheme:

a method for simulating contact and interaction between the support member and the chamber surrounding rock mass includes following steps:

obtaining a support scheme of a roadway to be simulated, and dividing the roadway to be simulated based on the support scheme to obtain a plurality of roadway sections;

obtaining physical and mechanical parameters of each rock stratum in each of the roadway sections and an occurrence state of a surrounding rock mass of the roadway;

constructing particle flow numerical models corresponding to the roadway sections based on the physical and mechanical parameters and the occurrence state;

based on the particle flow numerical models of every two adjacent roadway sections, obtaining a particle flow meso-structural evolution model of the roadway to be simulated; and obtaining meso-mechanical parameters of the roadway to be simulated based on the particle flow numerical models, calibrating the meso-mechanical parameters through the physical and mechanical parameters, and establishing the particle flow meso-structural evolution model of the roadway to be simulated, where the particle flow meso-structural evolution model is used for calculating meso-structural evolution data of the surrounding rock mass of the roadway to be simulated under the support scheme.

Optionally, a method for obtaining the roadway sections includes:

dividing the roadway to be simulated according to a unit length of a support member in the support scheme to obtain the plurality of roadway sections.

Optionally, a method for obtaining the physical and mechanical parameters includes:

obtaining standard cylindrical samples of each rock stratum in the roadway to be simulated;

carrying out a uniaxial compression test on the standard cylindrical samples to obtain a stress-strain curve of the standard cylindrical samples; and obtaining the physical and mechanical parameters of rocks according to the stress-strain curve.

Optionally, a method for obtaining the occurrence state of the surrounding rock mass of the roadway includes:

obtaining the occurrence state according to overall deformation characteristics of the surrounding rock mass of the roadway to be simulated;

the overall deformation characteristics of the surrounding rock mass of the roadway include a displacement-time relationship curve concerning a roof and a floor and two sides of the surrounding rock mass of the roadway and deformation characteristics of the surrounding rock mass of the roadway; and the occurrence state includes mining situations, rock mass parameters, geological structures and in-situ stress.

Optionally, a method for constructing the particle flow numerical models includes:

based on the physical and mechanical parameters and the occurrence state, according to rock stratum conditions of the roof and floor of the roadway section and the support scheme, carrying out a discrete element simulation on the rock mass and the support member, including a construction for particles used to simulate the corresponding rock stratum and the support member and a giving for a contact models of particle interface characteristics, and establishing a two-dimensional particle flow model; and applying stress and boundary conditions to a boundary of the two-dimensional particle flow model to obtain the particle flow numerical model.

Optionally, a method for obtaining the particle flow meso-structural evolution model of the roadway to be simulated includes:

unidirectionally superimposing the particle flow numerical model of the i+1-th roadway section on the particle flow numerical model of the i-th roadway section, merging into a new particle flow numerical model, and then repeating this step; and forming the particle flow meso-structural evolution model of the roadway to be simulated when all the particle flow numerical models are merged into one.

Optionally, a method for obtaining the meso-mechanical parameters includes:

establishing a uniaxial compression particle flow numerical model of standard rock samples by using a parallel bonding model, and obtaining the meso-mechanical parameters matched with results of a physical test by a trial-and-error method, checking and obtaining meso-particle parameters of each stratum and meso-interface contact parameters of the particle flow model.

Optionally, a method for calibrating the meso-mechanical parameters includes:

calibrating mesoscopic parameters of the support member according to a yield strength of a steel actually used by the support member; and establishing a tensile particle flow model of an anchor cable, matching a yield strength of a simulated test anchor cable with the physical test by adjusting the mesoscopic parameters bonded with anchor cable particles, so as to determine meso-contact parameters of an anchor cable member.

On the other hand, in order to achieve the above purpose, the application also provides a system for simulating contact and interaction between the support member and the chamber surrounding rock mass, including a roadway division unit, a roadway section parameter unit, a particle flow numerical model unit, a particle flow structure evolution unit and a parameter calibration unit;

the roadway division unit is used for obtaining the support scheme of the roadway to be simulated, and dividing the roadway to be simulated based on the support scheme to obtain the plurality of roadway sections;

the roadway section parameter unit is used for obtaining the physical and mechanical parameters of each rock stratum in the each of the roadway sections and the occurrence state of the surrounding rock mass of the roadway;

the particle flow numerical model unit is used for constructing the particle flow numerical models corresponding to the roadway sections based on the physical and mechanical parameters and the occurrence state;

the particle flow structure evolution unit is used for obtaining the particle flow meso-structural evolution model of the roadway to be simulated through the particle flow numerical models of every two adjacent roadway sections; and the parameter calibration unit is used for obtaining the meso-mechanical parameters of the roadway to be simulated based on the particle flow numerical models, calibrating the meso-mechanical parameters through the physical and mechanical parameters, establishing the particle flow meso-structural evolution model of the roadway to be simulated, and the particle flow meso-structural evolution model is used for calculating meso-structural evolution data of the surrounding rock mass of the roadway to be simulated under the support scheme.

The application has following beneficial effects.

The application discloses a method and a system for simulating contact and interaction between a support member and a chamber surrounding rock mass, detecting the bonded strain energy, kinetic energy and slip energy in real time, obtaining the temporal evolution law of strain energy release and dislocation slip energy of fractured surrounding rock mass after roadway excavation, reflecting the meso-mechanism of the support effect of the support member on the surrounding rock mass from the perspective of energy and fracture field evolution, obtaining the fracture distribution of the surrounding rock mass and the macro-failure mode of the surrounding rock mass and the support member, and providing a reference for improving the support scheme.

BRIEF DESCRIPTION OF THE DRAWINGS

In order to explain the technical scheme of the application more clearly, the drawings needed in the embodiments are briefly introduced below. Obviously, the drawings in the following description are only some embodiments of the application. For the ordinary technicians in the field, other drawings may be obtained according to these drawings without paying creative labor.

DETAILED DESCRIPTION OF THE EMBODIMENTS

The technical scheme in the embodiment of this application will be described clearly and thoroughly with reference to the attached drawings. Obviously, the described embodiment is only a part of the embodiment of this application, but not the whole embodiment. Based on the embodiments in this application, all other embodiments obtained by ordinary technicians in this field without creative work belong to the protection scope of this application.

In order to make the above objects, features and advantages of this application more obvious and easier to understand, the application is further described in detail with the drawings and specific implementation methods.

Embodiment 1

Figure 1:
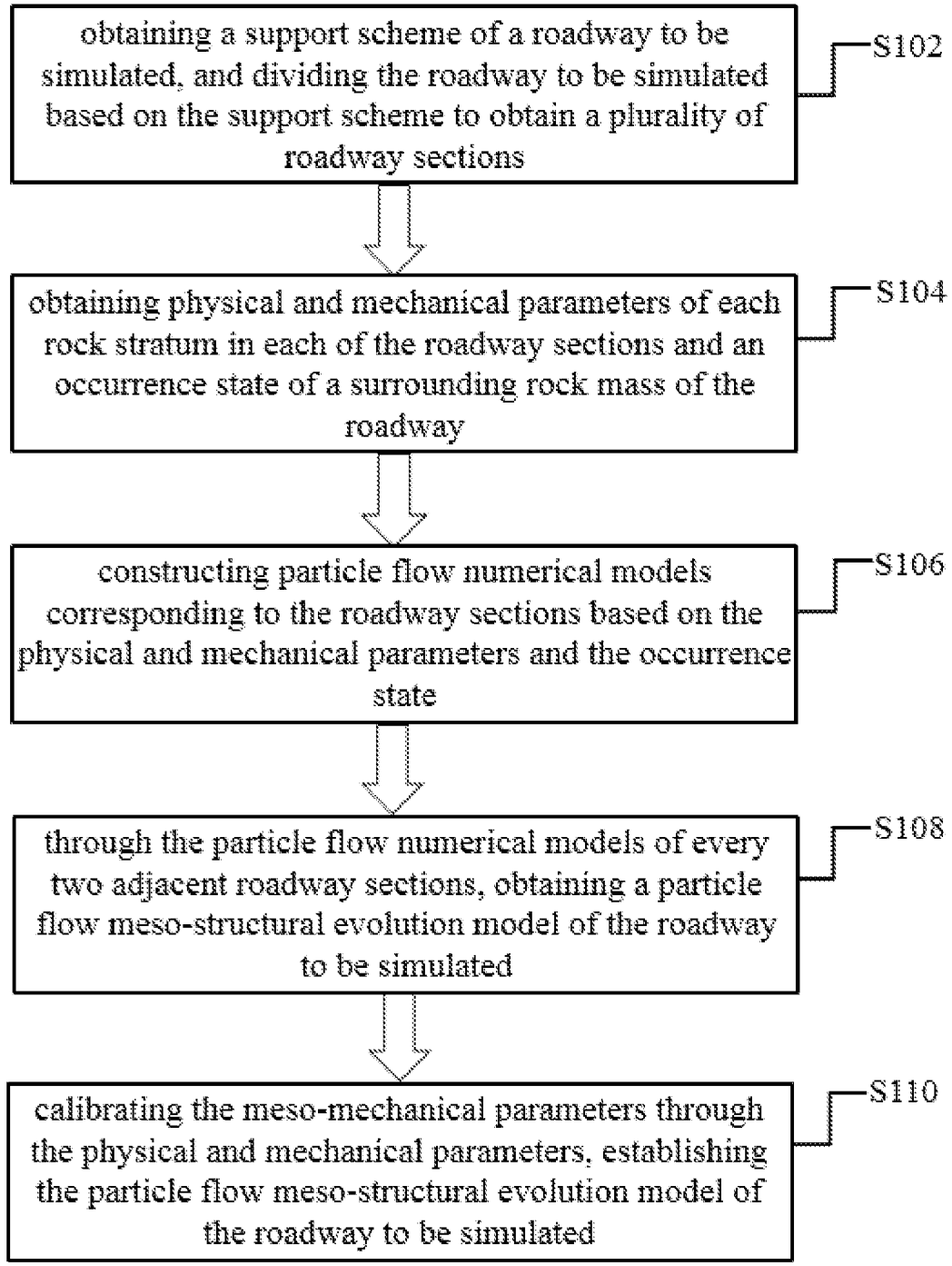
FIG. 1 is a flow chart of a method for simulating contact and interaction between a support member and a chamber surrounding rock mass according to Embodiment 1 of the application.

FIG. 1 is a flow chart of a method for simulating contact and interaction between a support member and a chamber surrounding rock mass according to Embodiment 1 of the application, the Embodiment 1 is mainly realized by following steps:

S102, obtaining a support scheme of a roadway to be simulated, and dividing the roadway to be simulated based on the support scheme to obtain a plurality of roadway sections.

Many existing researches are based on a whole roadway and a whole support structure, but the actual situation is that the pressures on the top and sides of the roadway come from multiple directions, including vertical pressure, horizontal pressure parallel to the roadway direction and horizontal pressure perpendicular to the roadway direction. However, the current research is basically only focus on the downward pressure on the top surface and the lateral pressure on the side surface, and the pressure research is obviously insufficient. In addition, due to the structural factors of the support member, the pressure on each part of the support member is not the same, that is, the pressure of the roadway facing the support member is not uniform, especially for the parts without the support member. Therefore, the study of roadway as a whole cannot accurately reflect the interaction between the support member and the surrounding rock mass.

For this reason, according to the support scheme of the roadway to be simulated, the embodiment of the application divides the whole roadway to be simulated into N sections with a unit support member as the unit length, and at the same time, the support scheme is divided together with the division of the roadway in the form of support parameters. Thus, each unit support member corresponds to a section of roadway. In this embodiment, the support scheme and corresponding support parameters mainly include: support member type, anchor rod specification, row spacing between anchors, tray size, anchor cable specification, row spacing between anchors and steel strip specification.

S104, obtaining physical and mechanical parameters of each rock stratum in each of the roadway sections and an occurrence state of a surrounding rock mass of the roadway.

In this embodiment, taking rock cores from the roof and two sides of the roadway in the roadway to be simulated, and then cutting the rock cores of each stratum to make them into standard rock samples with an aspect ratio of 2:1. Grinding the end faces of the samples, and controlling the flatness of the upper and lower end faces to be ±0.02 millimeter to avoid local damage of the sample caused by uneven surface. Carrying out a uniaxial compression test on the cut and polished samples to obtain a whole-process stress-strain curve of rock samples, and calculating rock basic mechanical parameters in each stratum, including uniaxial compressive strength, elastic modulus, Poisson's ratio and other basic rock mechanical parameters, which are used as the physical and mechanical parameters of the rock stratum.

Obtaining the occurrence state of roadway surrounding rock by observing the overall deformation characteristics of the surrounding rock mass of the roadway. In this embodiment, the overall deformation characteristics of the surrounding rock mass of the roadway include a displacement-time relationship curve concerning a roof and a floor and two sides of the surrounding rock mass of the roadway and deformation characteristics of the surrounding rock mass of the roadway. The occurrence state of the surrounding rock mass of the roadway includes roadway section size, buried depth, surrounding roadway excavation, rock mass parameters within the simulation range and the surrounding rock mass of the roadway including rock thickness, dip angle, lithology, bedding distribution and geological structures such as faults and folds. At the same time, the in-situ stress measurement is carried out at the location of the roadway, and the results include the buried depth of the measuring point, vertical stress, maximum horizontal principal stress and minimum horizontal principal stress. It provides a basis for giving the original rock stress of the roadway simulated by particle flow.

S106, constructing particle flow numerical models corresponding to the roadway sections based on the physical and mechanical parameters and the occurrence state.

In this embodiment, constructing the discrete element particle flow numerical model of the surrounding rock mass of the roadway by using particles, walls and contact constitutive models in the PFC discrete element software. Determining that the stratum range of the simulated roadway, the stratum distribution in the model, the roadway layout and the field geological conditions are consistent with the production situation. Determining the overall size of the simulation model according to the simulated roadway range, and determining that the shape and size of the simulated roadway are consistent with the actual situation.

Figure 2:
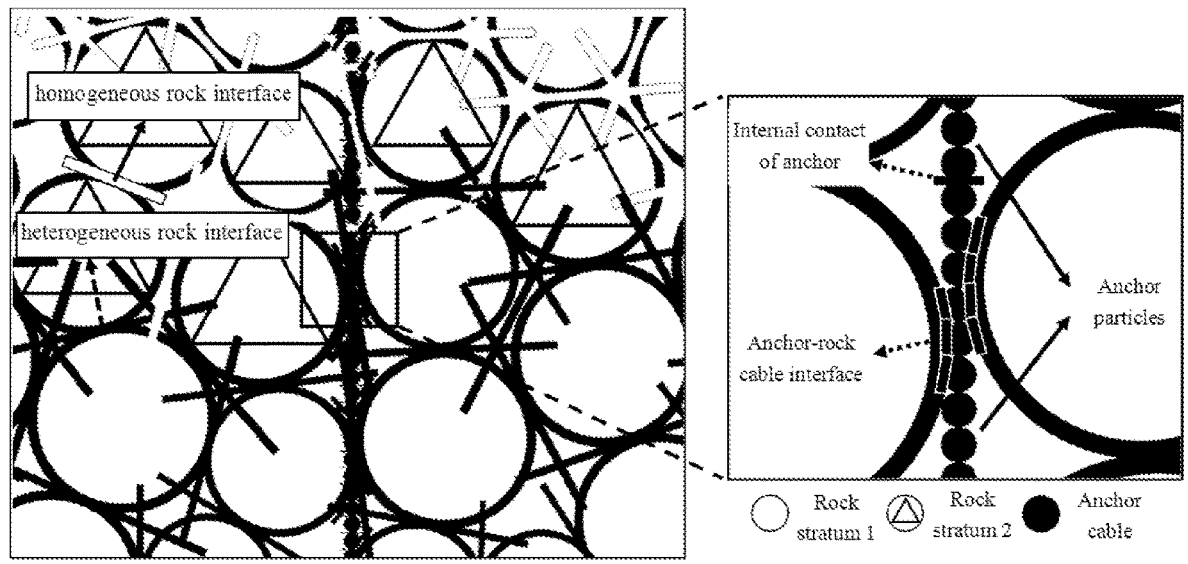
FIG. 2 is a schematic diagram of establishing the contact interface between the surrounding rock mass and the support according to Embodiment 1 of the application.

The generation of two media, rock matrix and support member, and the presence of interface contact model are the key points and ground of the embodiment of this application. According to the rock strata of the roof and the floor of the roadway in the simulated area and the roadway support scheme in the field, the discrete element simulation of the rock mass and the support member is carried out, which mainly includes two aspects, respectively the construction for particles used to simulate the corresponding rock stratum and the support member and a giving for a contact models of particle interface characteristics. According to the stratum distribution, the particles in the corresponding range of the model are grouped and given matching particle parameters such as density and friction coefficient. The simulation of the support member is also realized by particles, and matching particle parameters such as density and friction coefficient are given according to the physical properties of the support member. The parallel bonding model built in PFC is adopted between the particles of the rock stratum and the support member, and the microscopic parameters of the four contact interfaces (the homogeneous rock interface, the heterogeneous rock interface, the anchor cable interface and the rock-anchor cable interface) are given respectively by writing the fish language program. Based on this, a medium-interface two-dimensional particle flow model is established. As shown in FIG. 2, it is a schematic diagram of the contact interface between the surrounding rock mass and the support established in this embodiment. For the interface of the homogeneous rock interface, it is only necessary to implement the microscopic contact parameters of the rock itself, while for the heterogeneous rock interface, the microscopic contact parameters of rocks with weak bonding characteristics are given, for example, the contact parameters between coal particles should be given for the contact interface between coal and sandy mudstone. The rock-anchor cable contact interface is used to characterize the bonding effect of the resin anchoring agent and the anchoring effect of anchor cable on the surrounding rock mass of the roadway in the support process of the surrounding rock mass of the roadway.

The boundary condition of the simulation model is also an important factor affecting the simulation effect. In order to more truly simulate the original rock stress field where the real roadway is located, the displacement of the lower boundary of the model is constrained, the vertical stress and the horizontal stress are applied to the upper, left and right boundaries of the model in vertical and horizontal directions respectively through the servo mechanism, and the stress is consistent with the measured actual geostress.

In this embodiment, the specific steps of numerical simulation are as follows: first generating a rectangular boundary wall according to the set size of the surrounding rock mass of the roadway with no friction between the wall and the rock particles; then giving the original rock stress field to the model (according to the geological measurement results); simulating the excavation of the model roadway after the model is balanced under the applied geostress condition, and supporting the surrounding rock mass of the excavated roadway according to the actual support scheme, so as to simulate the evolution process of the meso-structure of the surrounding rock mass of the roadway under the support effect.

The fish language is written to realize the real-time monitoring of the number of tensile cracks and shear cracks in the whole numerical model, and to obtain the meso-characteristics of the spatio-temporal evolution of cracks on the surrounding rock mass and the damage of the support member in the roadway after excavation. The fish language is written to realize the real-time detection of bonded strain energy, kinetic energy and slip energy of the model, and to obtain the temporal evolution law of strain energy release and dislocation slip energy of fractured surrounding rock mass after roadway excavation, thus reflecting the meso-mechanism of the support effect of the support member on the surrounding rock mass from the perspective of energy. The distribution of cracks on the surrounding rock mass and the macro-failure mode of the surrounding rock and the support member are obtained, thus providing a reference for improving the support scheme.

S108, through the particle flow numerical models of every two adjacent roadway sections, obtaining a particle flow meso-structural evolution model of the roadway to be simulated.

In this embodiment, the particle flow numerical models of all the roadway sections are integrated into an integral particle flow meso-structural evolution model of the roadway by the unidirectional superposition. For example, from the first roadway section, the second roadway section is superimposed on the first roadway section to merge into a new particle flow numerical model, and the superimposed force is mainly the horizontal pressure horizontal to the roadway direction. Then the third roadway section is superimposed on the particle flow number model just obtained by the same method, and so on. When all the particle flow numerical models are merged into one, the particle flow meso-structural evolution model of the roadway to be simulated is formed.

S110, obtaining meso-mechanical parameters of the roadway to be simulated based on the particle flow numerical models, calibrating the meso-mechanical parameters through the physical and mechanical parameters, establishing the particle flow meso-structural evolution model of the roadway to be simulated, and the particle flow meso-structural evolution model is used for calculating meso-structural evolution data of the surrounding rock mass of the roadway to be simulated under the support scheme.

In this embodiment, the uniaxial compressive strengths of the stratum where the roadway is located, of the stratum where the immediate roof is located, of the stratum where the basic roof is located, of the stratum where the immediate floor is located and of the stratum where the basic floor is located are obtained according to the test results of the rock cores in each stratum within the scope of the simulated roadway. The uniaxial compression particle flow numerical models of standard rock samples with a height-diameter ratio of 2:1 are respectively established by using a parallel bonding model, the meso-mechanical parameters matched with results of the physical test are obtained by a trial-and-error method, and the meso-particle parameters of each stratum and the meso-interface contact parameters of the particle flow model are obtained by checking. The mesoscopic parameters of the support member are calibrated according to the yield strength of the steel actually used by the support member. Because the anchor cable is mainly subjected to tensile stress in the real support, the tensile test is generally used to obtain the stress-strain curve of the anchor cable in the whole tensile process and obtain the yield strength of the anchor cable. Similarly, the tensile particle flow model of anchor cable is established, and the contact model between particles of anchor cable adopts the parallel bonding model. A same outward velocity is applied to the two section of particles, and the tensile test is carried out on the anchor cable model until the numerical model of the anchor cable is broken. The axial stress everywhere in the axial direction is obtained through a series of measuring circles arranged along the anchor cable, so as to obtain the tensile stress-strain curve and yield strength of the numerical model of the anchor cable. By constantly adjusting the mesoscopic parameters bonded with anchor cable particles, matching a yield strength of a simulated test anchor cable with the physical test, so as to determine meso-contact parameters of an anchor cable member.

After constructing the medium-interface particle flow model and calibrating the mesoscopic parameters according to the physical and mechanical parameters of the actual stratum rock, the model is calculated and the calculation termination conditions are set, and finally the particle flow meso-structure evolution model under the corresponding support scheme is obtained, and is used to calculate the meso-structure evolution data of the surrounding rock of the roadway to be simulated under the support scheme.

Figure 3:
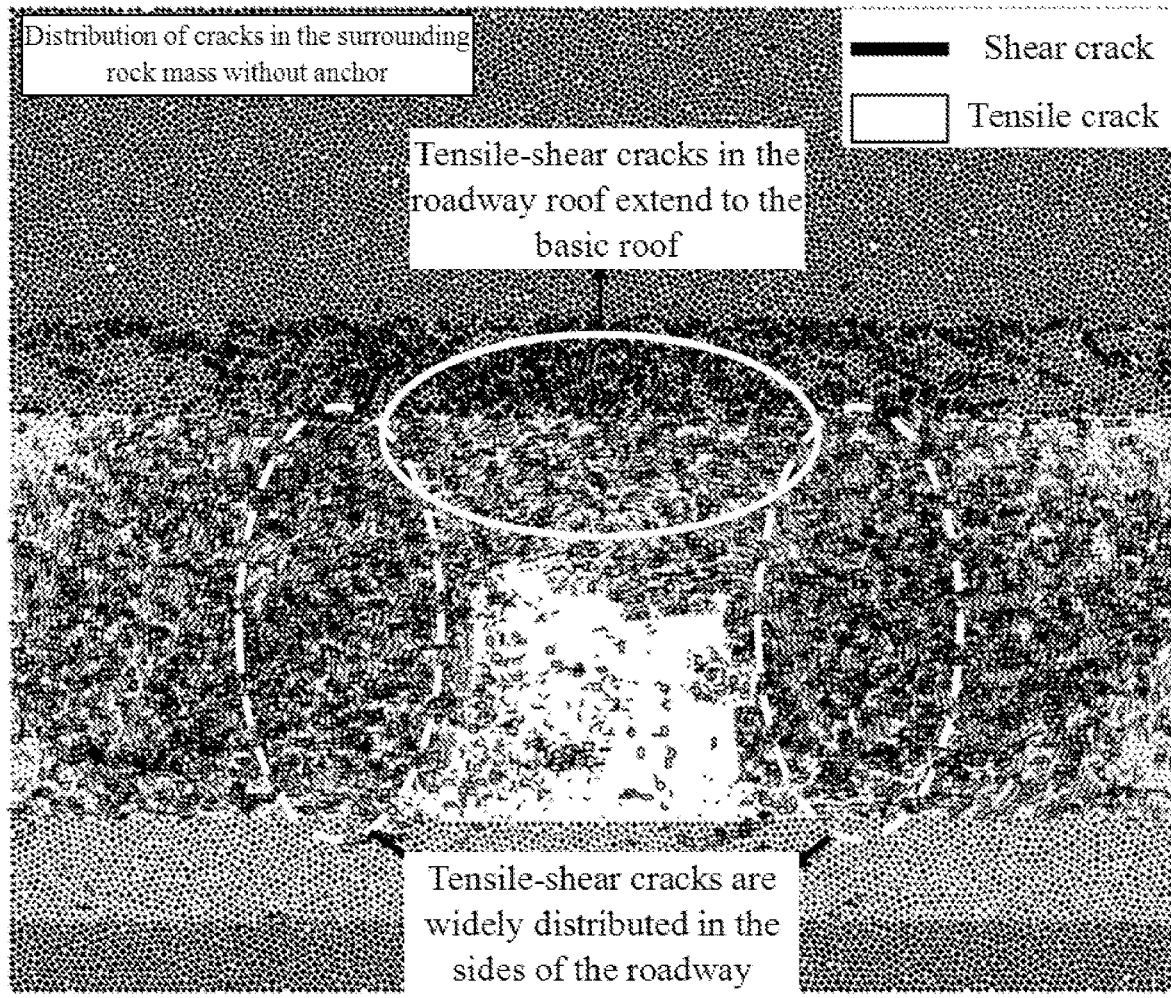
FIG. 3 is a schematic diagram of the distribution of cracks in the surrounding rock mass of the unsupported roadway after the excavation of the roadway to be simulated is balanced for 2 seconds according to Embodiment 1 of the application.
Figure 4:
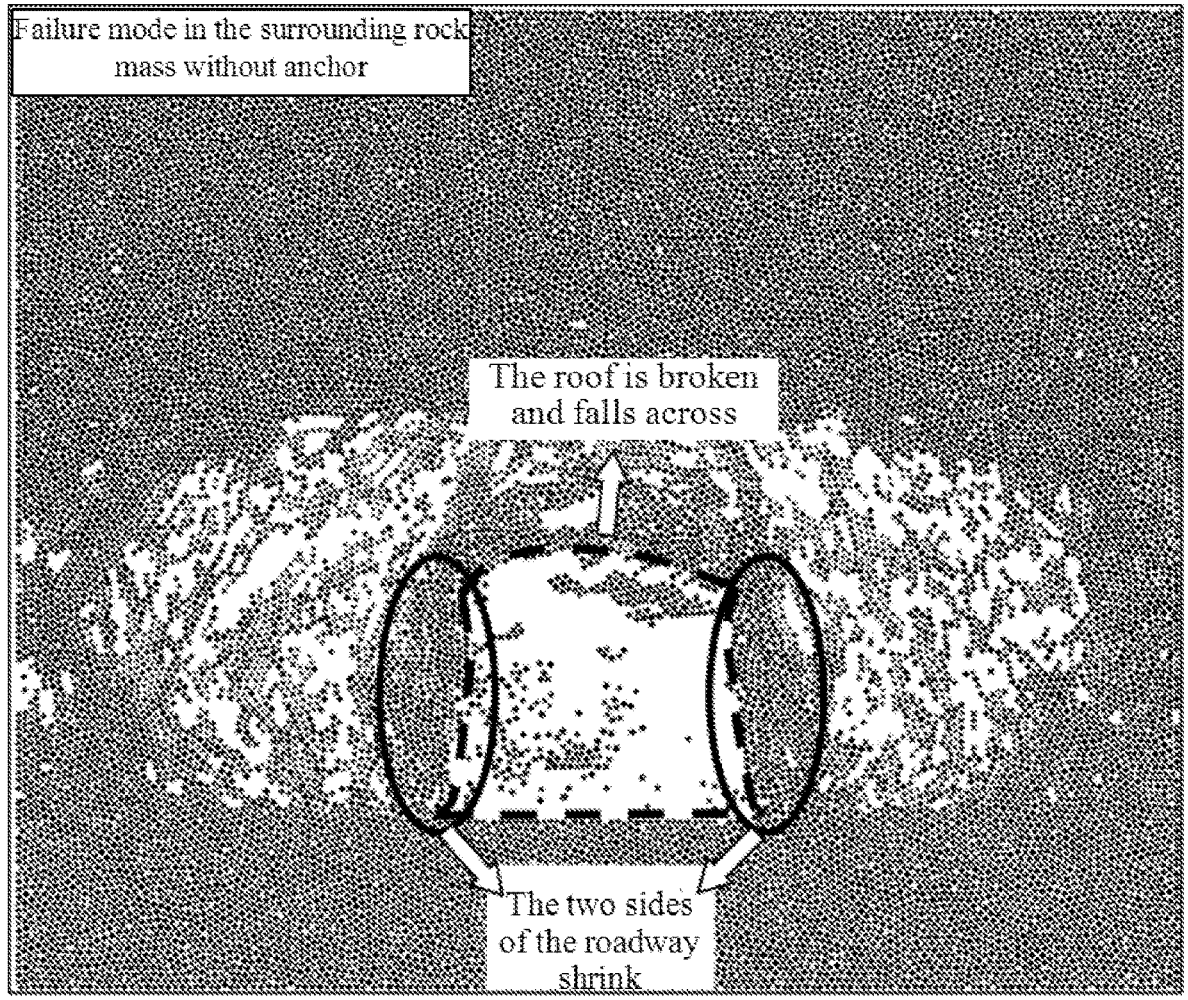
FIG. 4 is a failure mode schematic diagram of the surrounding rock mass of an anchor-free roadway according to Embodiment 1 of the application.

By adopting the technical scheme of this embodiment, the analysis results are as follows:

as shown in FIG. 3, it is a schematic diagram of the distribution of cracks in the surrounding rock mass of the unsupported roadway after the excavation of the roadway to be simulated is balanced for 2 seconds. Where the outlined rectangle represents tensile crack and black represents shear crack. It is found that tensile-shear cracks are widely distributed in the surrounding rock area after excavation for 2 seconds, and the tensile-shear cracks in the roadway roof extend to the basic roof. With the increase of the distance from the roof, the crack density gradually decreases, and the surrounding rock of the roadway roof is broken to a higher degree. Tensile-shear cracks are all over the roadway side, and the deformation of surrounding rock is large. The roof of the roadway is broken and falls across, and it is arched after being broken. The displacement of the two sides of the surrounding rock mass is large, and the whole wall shrinks inward. The rock burst leads to the instability of the surrounding rock mass of the roadway and the particles splash into the roadway. The surface surrounding rock mass is separated from the deep surrounding rock mass, and presents an annular failure mode centered on the excavated roadway, with a high degree of fragmentation and poor integrity, as shown in FIG. 4.

Figure 5:
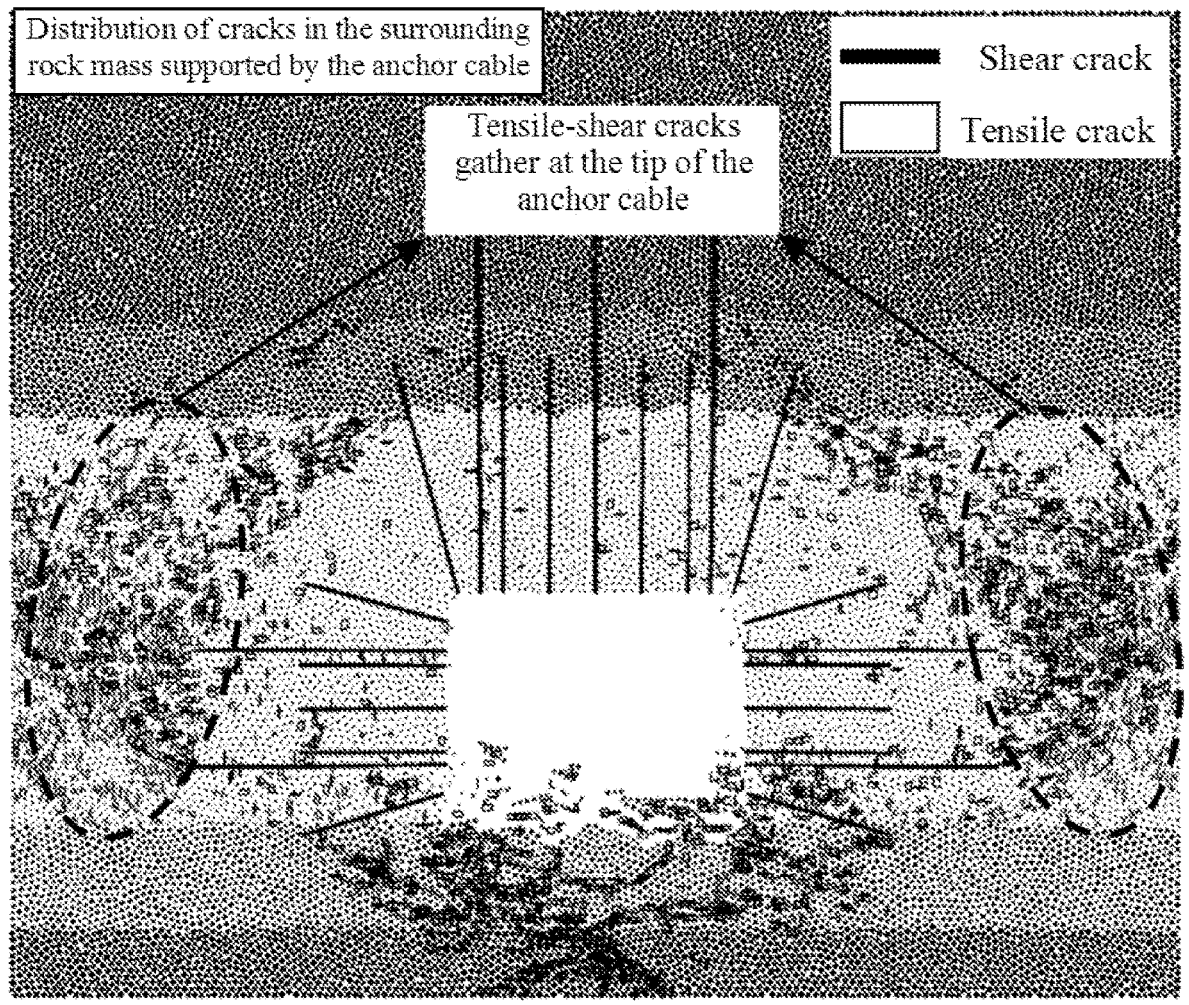
FIG. 5 is a schematic diagram of the crack distribution in the surrounding rock mass of the roadway supported by the anchor cable when the excavation of the roadway to be simulated is balanced for 2 seconds according to Embodiment 1 of the application.
Figure 6:
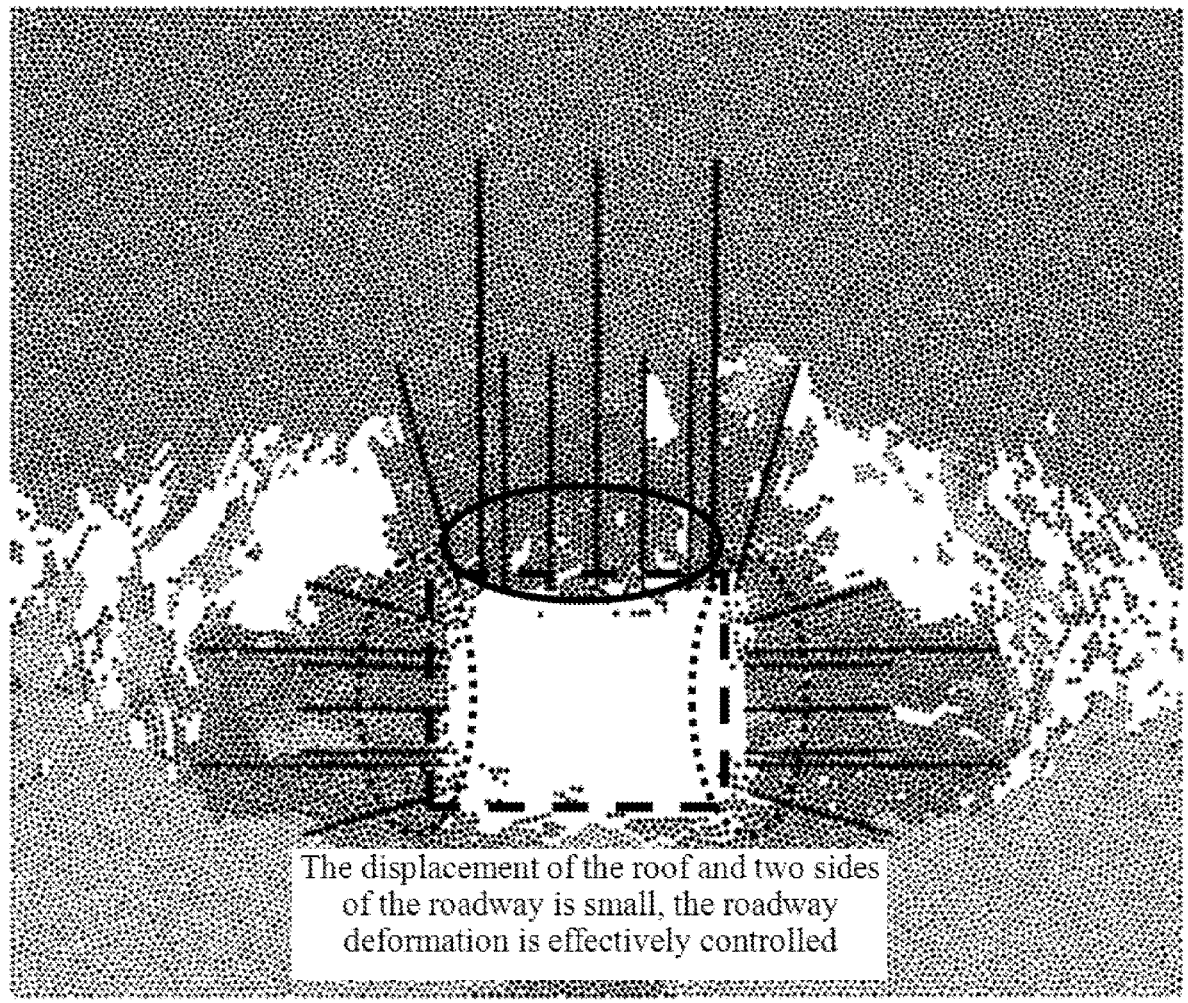
FIG. 6 is a failure mode schematic diagram of the surrounding rock mass of the roadway supported by the anchor cable according to Embodiment 1 of the application.

FIG. 5 is a schematic diagram of the crack distribution in the surrounding rock mass of the roadway supported by the anchor cable when the excavation of the roadway to be simulated is balanced for 2 seconds. It can be seen that the tensile-shear cracks mainly originate in the rock stratum outside the anchorage zone, the direct bedrock stratum and the anchorage interface where the anchor cable interacts with the surrounding rock mass in the anchorage zone. Tensile-shear cracks gather at the end of the anchor cable, and they extend from the tip of two groups of anchor cables to the tip of the roof anchor cable. Different from the unsupported roadway, the cracks in the surrounding rock mass anchorage zone of the roadway supported by anchor cable are less developed, and finally an arch crack shape extending along the tip of anchor cable is formed. FIG. 6 is a failure mode schematic diagram of the surrounding rock mass of the roadway supported by the anchor cable. The displacement of the roof and two sides of the roadway is small, and the phenomenon of roof caving and falling of the roadway without anchoring does not appear. The shrinkage of the two sides is effectively controlled, and the surrounding rock of the roadway in the anchorage area is relatively complete, forming a relatively stable arch-shaped complete surrounding rock area around the roadway, which greatly weakens the impact of rock burst on the roadway.

Figure 7:
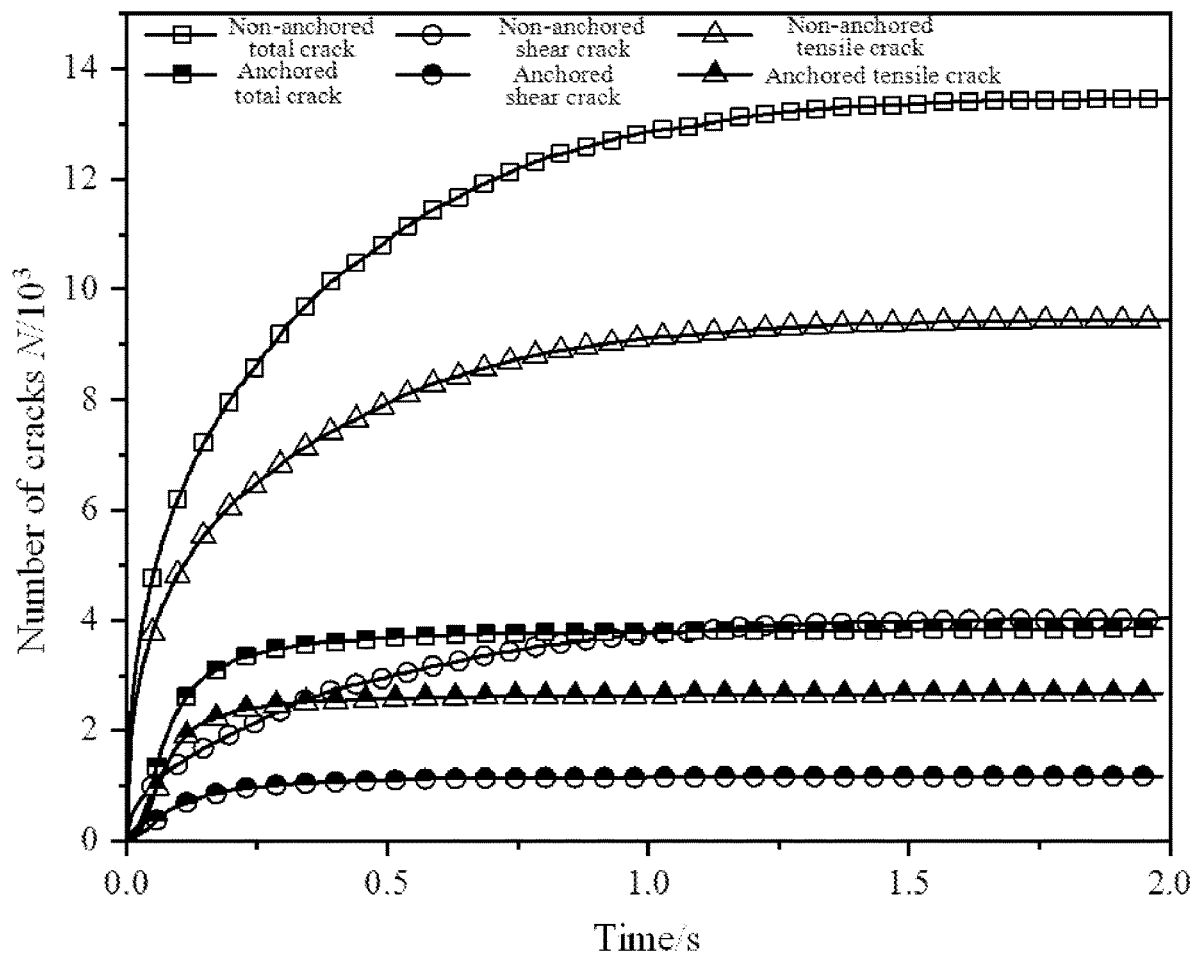
FIG. 7 shows a whole process of crack evolution of the roadway model with and without anchors, obtained by a real-time monitoring of the number of cracks in the model the 2.5 seconds balance process of the roadway according to Embodiment 1 of the application.

The number of cracks in the model during the 2-seconds balance of the roadway is monitored in real time, and the whole process of crack evolution of the roadway model with and without anchors is obtained, as shown in FIG. 7. After excavation, the evolution of the number of cracks in the surrounding rock mass of the roadway presents a logical function form, roughly divided into two stages: acceleration and stability. At the initial stage of balance of the excavation, the number of cracks increases rapidly, and gradually tends to be stable with the increase of balance time. In the acceleration stage, the growth rate of cracks in the anchored roadway is obviously lower than that in the non-anchored roadway. The reinforcement effect of the anchor cable support member on the surrounding rock mass of the roadway inhibits the initiation of tensile-shear cracks, and the existence of the anchorage zone further hinders the crack propagation, greatly increasing the overall stability of the surrounding rock at the initial stage of excavation. After reaching the stable stage, the number of cracks in the roadways with anchor and without anchors remained basically unchanged with time, and the total number of cracks in the roadway supported by anchor cable is much lower than that in the roadway without anchor, and the total number decreases by about 70%, where the inhibition effect of anchor cable on the shear crack is more obvious, reaching 74%, which plays a great role in maintaining the long-term stability of the surrounding rock mass of the roadway. It is worth noting that it takes about 1.5 seconds for the roadway without anchor from the excavation to the stable stage, while it only takes about 0.5 second for the roadway with anchor. The anchor cable support accelerates the stress redistribution of the surrounding rock after excavation, the stress redistribution time of the roadway with anchor is shortened to one third of that of the roadway without anchor.

Figure 8:
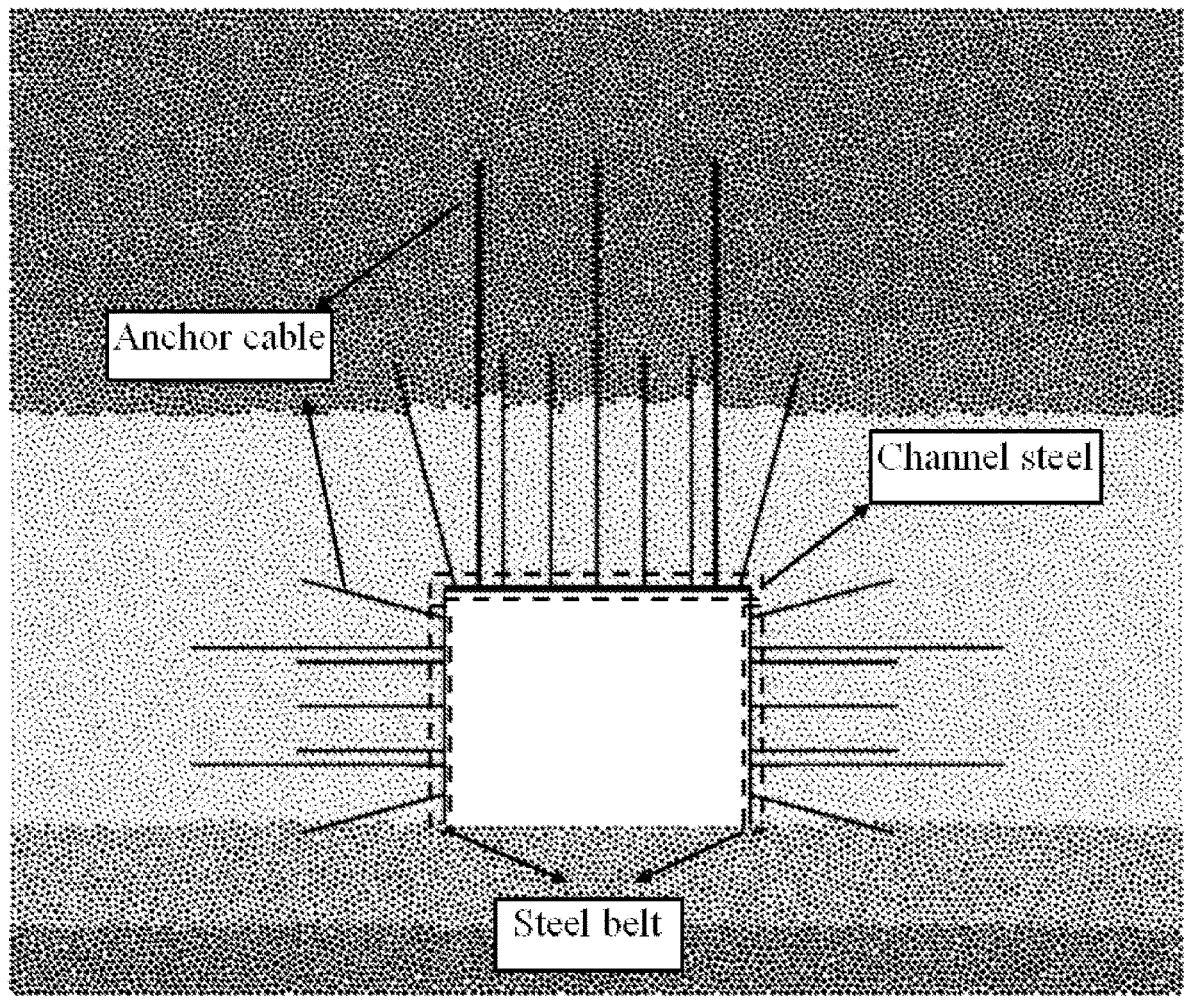
FIG. 8 is a schematic diagram of the particle flow model under a combined support of the anchor cable, the channel steel and the steel belt according to Embodiment 1 of the application.
Figure 9:
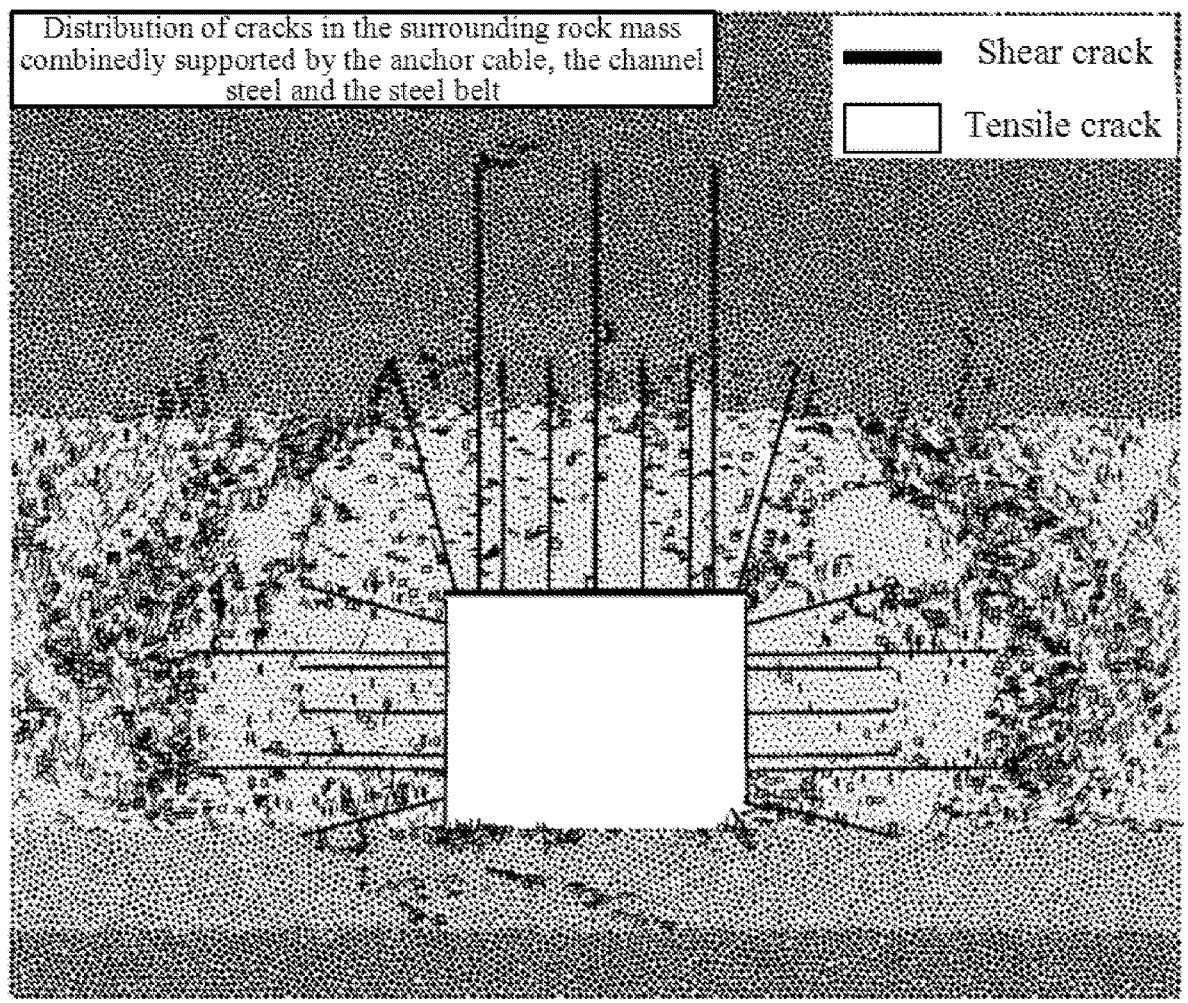
FIG. 9 is a schematic diagram showing the distribution of cracks in the surrounding rock mass under the combined support of the anchor cable, the channel steel and the steel belt according to Embodiment 1 of the application.
Figure 10:
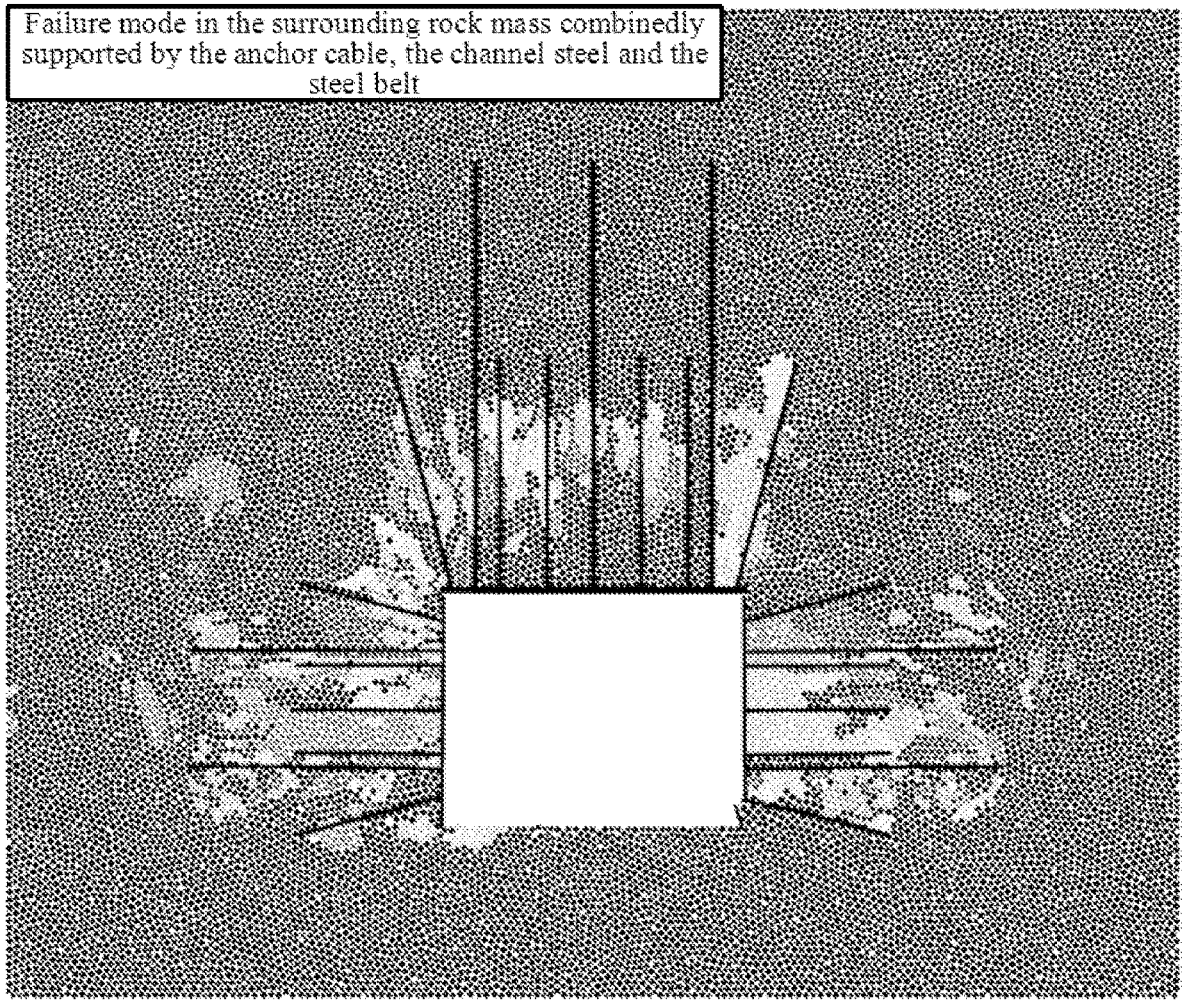
FIG. 10 is a failure mode schematic diagram of the surrounding rock mass under the combined support of the anchor cable, the channel steel and the steel belt according to Embodiment 1 of the application.

On the basis of the anchor cable support member, channel steel and other components are added to connect the end of anchor cable, thus further improving the integrity and stability of the support structure. The particle flow model is shown in FIG. 8. The excavation balance of the combined support model of the anchor cable, the channel steel and the steel belt are calculated; the distribution of cracks in the surrounding rock mass of the roadway after 2 seconds is shown in FIG. 9. It is not difficult to find that, compared with the roadway supported by anchor cable, the displacement of the floor of the combined support roadway is significantly reduced, the floor heave phenomenon disappears, the roof, the floor and the two sides do not have large displacement, and the overall shape of the surrounding rock is regular. Tensile-shear cracks also gather at the end of anchor cable, but the crack density is obviously lower than that of roadway supported by anchor cable. FIG. 10 shows a failure mode schematic diagram of the surrounding rock mass under the combined support. It can be seen that the surrounding rock mass of the roof in the anchorage zone is hardly broken, and the surrounding rock block is large, with a high integrity and a further enhanced stability. Compared with the roadway supported by anchor cable, because of the displacement inhibition of channel steel strip on the unloading surrounding rock mass, the broken blocks of the surrounding rock of the two sides of the combined support roadway are larger, and a complete distribution of surrounding rock blocks with anchor cable as the boundary is formed. Compared with the roadway supported by anchor cable, the crushing degree of the deep surrounding rock mass is greatly reduced, and the crack density around the anchorage zone is reduced. There is no circular failure mode of the roadway supported by anchor cable around the anchor cable, and there is no obvious delamination between the anchorage zone and the non-anchorage zone, so the integrity of the surrounding rock mass of the roadway is improved.

Embodiment 2

Figure 11:
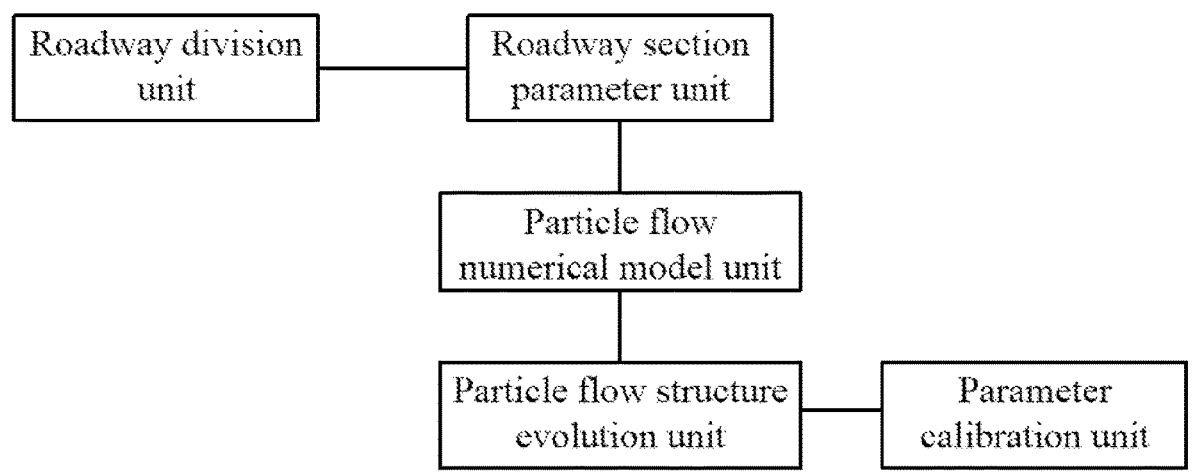
FIG. 11 is a schematic structural diagram of a system for simulating contact and interaction between a support member and a chamber surrounding rock mass according to Embodiment 2 of the application.

As shown in FIG. 11, it is a schematic structural diagram of a system for simulating contact and interaction between a support member and a chamber surrounding rock mass according to Embodiment 2 of the application, mainly including a roadway division unit, a roadway section parameter unit, a particle flow numerical model unit, a particle flow structure evolution unit and a parameter calibration unit.

Specifically, the roadway division unit is used for obtaining the support scheme of the roadway to be simulated, and dividing the roadway to be simulated based on the support scheme to obtain the plurality of roadway sections. In this embodiment, the whole roadway to be simulated is divided into N sections with a unit support member as the unit length, and at the same time, the support scheme is divided together with the division of the roadway in the form of support parameters. Thus, each unit support member corresponds to a section of roadway. In this embodiment, the support scheme and corresponding support parameters mainly include: support member type, anchor rod specification, row spacing between anchors, tray size, anchor cable specification, row spacing between anchors and steel strip specification.

The roadway section parameter unit is used for obtaining the physical and mechanical parameters of each rock stratum in the each of the roadway sections and the occurrence state of the surrounding rock mass of the roadway. In this embodiment, taking rock cores from the roof and two sides of the roadway in the roadway to be simulated, and then cutting the rock cores of each stratum to make them into standard rock samples with an aspect ratio of 2:1. Grinding the end faces of the samples, and controlling the flatness of the upper and lower end faces to be ±0.02 millimeter to avoid local damage of the sample caused by uneven surface. Carrying out a uniaxial compression test on the cut and polished samples to obtain a whole-process stress-strain curve of rock samples, and calculating rock basic mechanical parameters in each stratum, including uniaxial compressive strength, elastic modulus, Poisson's ratio and other basic rock mechanical parameters, which are used as the physical and mechanical parameters of the rock stratum. Obtaining the occurrence state of roadway surrounding rock by observing the overall deformation characteristics of the surrounding rock mass of the roadway. In this embodiment, the overall deformation characteristics of the surrounding rock mass of the roadway include a displacement-time relationship curve concerning a roof and a floor and two sides of the surrounding rock mass of the roadway and deformation characteristics of the surrounding rock mass of the roadway. The occurrence state of the surrounding rock mass of the roadway includes roadway section size, buried depth, surrounding roadway excavation, rock mass parameters within the simulation range and the surrounding rock mass of the roadway including rock thickness, dip angle, lithology, bedding distribution and geological structures such as faults and folds. At the same time, the in-situ stress measurement is carried out at the location of the roadway, and the results include the buried depth of the measuring point, vertical stress, maximum horizontal principal stress and minimum horizontal principal stress. Therefore a a basis for giving the original rock stress of the roadway simulated by particle flow is provided.

The particle flow numerical model unit is used for constructing the particle flow numerical models corresponding to the roadway sections based on the physical and mechanical parameters and the occurrence state. In this embodiment, constructing the discrete element particle flow numerical model of the surrounding rock mass of the roadway by using particles, walls and contact constitutive models in the PFC discrete element software. Determining that the stratum range of the simulated roadway, the stratum distribution in the model, the roadway layout and the field geological conditions are consistent with the production situation. Determining the overall size of the simulation model according to the simulated roadway range, and determining that the shape and size of the simulated roadway are consistent with the actual situation. The generation of two media, rock matrix and support member, and the giving of interface contact model are the emphases and foundation of the embodiment of this application. According to the rock strata of the roof and the floor of the roadway in the simulated area and the roadway support scheme in the field, the discrete element simulation of the rock mass and the support member is carried out, which mainly includes two aspects, respectively the construction for particles used to simulate the corresponding rock stratum and the support member and a giving for a contact models of particle interface characteristics. According to the stratum distribution, the particles in the corresponding range of the model are grouped and given matching particle parameters such as density and friction coefficient. The simulation of the support member is also realized by particles, and matching particle parameters such as density and friction coefficient are given according to the physical properties of the support member. The parallel bonding model built in PFC is adopted between the particles of the rock stratum and the support member, and the microscopic parameters of the four contact interfaces (the homogeneous rock interface, the heterogeneous rock interface, the anchor cable interface and the rock-anchor cable interface) are given respectively by writing the fish language program. Based on this, a medium-interface two-dimensional particle flow model with "two media-four interfaces" is established. For the interface of the homogeneous rock interface, it is only necessary to implement the microscopic contact parameters of the rock itself, while for the heterogeneous rock interface, the microscopic contact parameters of rocks with weak bonding characteristics are given, for example, the contact parameters between coal particles should be given for the contact interface between coal and sandy mudstone. The rock-anchor cable contact interface is used to characterize the bonding effect of the resin anchoring agent and the anchoring effect of anchor cable on the surrounding rock mass of the roadway in the support process of the surrounding rock mass of the roadway.

The particle flow structure evolution unit is used for obtaining the particle flow meso-structural evolution model of the roadway to be simulated through the particle flow numerical models of every two adjacent roadway sections. In this embodiment, the particle flow numerical models of all the roadway sections are integrated into an integral particle flow meso-structural evolution model of the roadway by the unidirectional superposition. Concretely, from the first roadway section, the second roadway section is superimposed on the first roadway section to merge into a new particle flow numerical model, and the superimposed force is mainly the horizontal pressure horizontal to the roadway direction. Then the third roadway section is superimposed on the particle flow number model just obtained by the same method, and so on. When all the particle flow numerical models are merged into one, the particle flow meso-structural evolution model of the roadway to be simulated is formed.

The parameter calibration unit is used for obtaining the meso-mechanical parameters of the roadway to be simulated based on the particle flow numerical models, calibrating the meso-mechanical parameters through the physical and mechanical parameters, establishing the particle flow meso-structural evolution model of the roadway to be simulated, and the particle flow meso-structural evolution model is used for calculating meso-structural evolution data of the surrounding rock mass of the roadway to be simulated under the support scheme. In this embodiment, the uniaxial compressive strengths of the stratum where the roadway is located, of the stratum where the immediate roof is located, of the stratum where the basic roof is located, of the stratum where the immediate floor is located and of the stratum where the basic floor is located are obtained according to the test results of the rock cores in each stratum within the scope of the simulated roadway. The uniaxial compression particle flow numerical models of standard rock samples with a height-diameter ratio of 2:1 are respectively established by using a parallel bonding model, the meso-mechanical parameters matched with results of the physical test are obtained by a trial-and-error method, and the meso-particle parameters of each stratum and the meso-interface contact parameters of the particle flow model are obtained by checking. The mesoscopic parameters of the support member are calibrated according to the yield strength of the steel actually used by the support member. Because the anchor cable is mainly subjected to tensile stress in the real support, the tensile test is generally used to obtain the stress-strain curve of the anchor cable in the whole tensile process and obtain the yield strength of the anchor cable. Similarly, the tensile particle flow model of anchor cable is established, and the contact model between particles of anchor cable adopts the parallel bonding model. A same outward velocity is applied to the two section of particles, and the tensile test is carried out on the anchor cable model until the numerical model of the anchor cable is broken. The axial stress everywhere in the axial direction is obtained through a series of measuring circles arranged along the anchor cable, so as to obtain the tensile stress-strain curve and yield strength of the numerical model of the anchor cable. By constantly adjusting the mesoscopic parameters bonded with anchor cable particles, matching a yield strength of a simulated test anchor cable with the physical test, so as to determine meso-contact parameters of an anchor cable member. After constructing the support roadway particle flow model with "two media-four interfaces" and calibrating the mesoscopic parameters according to the physical and mechanical parameters of the actual stratum rock, the model is calculated and the calculation termination conditions are set, and finally the particle flow meso-structure evolution model under the corresponding support scheme is obtained, and is used to calculate the meso-structure evolution data of the surrounding rock of the roadway to be simulated under the support scheme.

The above-mentioned embodiments are only a description of the preferred mode of the application, and do not limit the scope of the application. Under the premise of not departing from the design spirit of the application, various modifications and improvements made by ordinary technicians in the field to the technical scheme of the application shall fall within the protection scope determined by the claims of the application.

What is claimed is:
1. A method for simulating contact and interaction between a support member and a chamber surrounding rock mass, comprising following steps:
obtaining a support scheme of a roadway to be simulated, and dividing the roadway to be simulated based on the support scheme to obtain a plurality of roadway sections; wherein a method for obtaining the roadway sections comprises: dividing the roadway to be simulated according to a unit length of the support member in the support scheme to obtain the plurality of roadway sections;
obtaining physical and mechanical parameters of each rock stratum in each of the roadway sections and an occurrence state of a surrounding rock mass of the roadway; wherein a method for obtaining the physical and mechanical parameters comprises: obtaining standard cylindrical samples of each rock stratum in the roadway to be simulated; carrying out a uniaxial compression test on the standard cylindrical samples to obtain a stress-strain curve of the standard cylindrical samples; and obtaining the physical and mechanical parameters of rocks according to the stress-strain curve; wherein a method for obtaining the occurrence state of the surrounding rock mass of the roadway comprises: obtaining the occurrence state according to overall deformation characteristics of the surrounding rock mass of the roadway to be simulated; the overall deformation characteristics of the surrounding rock mass of the roadway comprise a displacement-time relationship curve concerning a roof and a floor and two sides of the surrounding rock mass of the roadway and deformation characteristics of the surrounding rock mass of the roadway; and the occurrence state comprises mining situations, rock mass parameters, geological structures and in-situ stress;
constructing particle flow numerical models corresponding to the roadway sections based on the physical and mechanical parameters and the occurrence state; wherein a method for constructing the particle flow numerical models comprises: carrying out a discrete element simulation on the rock mass and the support member based on the physical and mechanical parameters and the occurrence state and according to rock stratum conditions of the roof and floor of the roadway sections and the support scheme, comprising constructing particles used for simulating corresponding rock strata and the support member and giving contact models of particle interface characteristics, and establishing a two-dimensional particle flow model; and applying stress and boundary conditions to a boundary of the two-dimensional particle flow model to obtain the particle flow numerical model;
obtaining a particle flow meso-structural evolution model of the roadway to be simulated through the particle flow numerical models of every two adjacent roadway sections; wherein a method for obtaining the particle flow meso-structural evolution model of the roadway to be simulated comprises: unidirectionally superimposing the particle flow numerical model of the i+1-th roadway section on the particle flow numerical model of the i-th roadway section, merging into a new particle flow numerical model, and then repeating the step; and forming the particle flow meso-structural evolution model of the roadway to be simulated when all the particle flow numerical models are merged into one; and
obtaining meso-mechanical parameters of the roadway to be simulated based on the particle flow numerical models, calibrating the meso-mechanical parameters through the physical and mechanical parameters, establishing the particle flow meso-structural evolution model of the roadway to be simulated, wherein the particle flow meso-structural evolution model is used for calculating meso-structural evolution data of the surrounding rock mass of the roadway to be simulated under the support scheme, and a method for obtaining the meso-mechanical parameters comprises: establishing a uniaxial compression particle flow numerical model of standard rock samples by using a parallel bonding model, and obtaining the meso-mechanical parameters matched with results of a physical test by a trial-and-error method, checking and obtaining meso-particle parameters of each stratum and meso-interface contact parameters of the particle flow model;

wherein a method for calibrating the meso-mechanical parameters comprises:

calibrating mesoscopic parameters of the support member according to a yield strength of a steel actually used by the support member; and establishing a tensile particle flow model of an anchor cable, matching a yield strength of a simulated test anchor cable with the physical test by adjusting the mesoscopic parameters bonded with anchor cable particles, so as to determine meso-contact parameters of an anchor cable member.

2. A system for simulating contact and interaction between a support member and a chamber surrounding rock mass, comprising a roadway division unit, a roadway section parameter unit, a particle flow numerical model unit, a particle flow structure evolution unit and a parameter calibration unit;

wherein the roadway division unit is used for obtaining a support scheme of a roadway to be simulated, and dividing the roadway to be simulated based on the support scheme to obtain a plurality of roadway sections; wherein a method for obtaining the roadway sections comprises: dividing the roadway to be simulated according to a unit length of the support member in the support scheme to obtain the plurality of roadway sections;

the roadway section parameter unit is used for obtaining physical and mechanical parameters of each rock stratum in each of the roadway sections and an occurrence state of a surrounding rock mass of the roadway; wherein a method for obtaining the physical and mechanical parameters comprises: obtaining standard cylindrical samples of each rock stratum in the roadway to be simulated; carrying out a uniaxial compression test on the standard cylindrical samples to obtain a stress-strain curve of the standard cylindrical samples; and obtaining the physical and mechanical parameters of rocks according to the stress-strain curve; wherein a method for obtaining the occurrence state of the surrounding rock mass of the roadway comprises: obtaining the occurrence state according to overall deformation characteristics of the surrounding rock mass of the roadway to be simulated; the overall deformation characteristics of the surrounding rock mass of the roadway comprise a displacement-time relationship curve concerning a roof and a floor and two sides of the surrounding rock mass of the roadway and deformation characteristics of the surrounding rock mass of the roadway; and the occurrence state comprises mining situations, rock mass parameters, geological structures and in-situ stress;

the particle flow numerical model unit is used for constructing particle flow numerical models corresponding to the roadway sections based on the physical and mechanical parameters and the occurrence state; wherein a method for constructing the particle flow numerical models comprises: carrying out a discrete element simulation on the rock mass and the support member based on the physical and mechanical parameters and the occurrence state and according to rock stratum conditions of the roof and floor of the roadway sections and the support scheme, comprising constructing particles used for simulating corresponding rock strata and the support member and giving contact models of particle interface characteristics, and establishing a two-dimensional particle flow model; and applying stress and boundary conditions to a boundary of the two-dimensional particle flow model to obtain the particle flow numerical model;

the particle flow structure evolution unit is used for obtaining a particle flow meso-structural evolution model of the roadway to be simulated through the particle flow numerical models of every two adjacent roadway sections; wherein a method for obtaining the particle flow meso-structural evolution model of the roadway to be simulated comprises: unidirectionally superimposing the particle flow numerical model of the i+1-th roadway section on the particle flow numerical model of the i-th roadway section, merging into a new particle flow numerical model, and then repeating the step; and forming the particle flow meso-structural evolution model of the roadway to be simulated when all the particle flow numerical models are merged into one; and the parameter calibration unit is used for obtaining meso-mechanical parameters of the roadway to be simulated based on the particle flow numerical models, calibrating the meso-mechanical parameters through the physical and mechanical parameters, establishing the particle flow meso-structural evolution model of the roadway to be simulated, wherein the particle flow meso-structural evolution model is used for calculating meso-structural evolution data of the surrounding rock mass of the roadway to be simulated under the support scheme; and a method for obtaining the meso-mechanical parameters comprises: establishing a uniaxial compression particle flow numerical model of standard rock samples by using a parallel bonding model, and obtaining the meso-mechanical parameters matched with results of a physical test by a trial-and-error method, checking and obtaining meso-particle parameters of each stratum and meso-interface contact parameters of the particle flow model;

wherein a method for calibrating the meso-mechanical parameters comprises:

calibrating mesoscopic parameters of the support member according to a yield strength of a steel actually used by the support member; and establishing a tensile particle flow model of an anchor cable, matching a yield strength of a simulated test anchor cable with the physical test by adjusting the mesoscopic parameters bonded with anchor cable particles, so as to determine meso-contact parameters of an anchor cable member.

* * * * *